United States Patent
Waitz et al.

(10) Patent No.: US 12,064,054 B2
(45) Date of Patent: Aug. 20, 2024

(54) LOADING AND UNLOADING STATION AND ALSO LOADING AND/OR UNLOADING METHOD OF A COOKING APPARATUS TO DETERMINE THE LOAD OF THE COOKING CHAMBER OF THE COOKING DEVICE

(71) Applicant: RATIONAL AKTIENGESELLSCHAFT, Landsberg am Lech (DE)

(72) Inventors: Reimar Waitz, Landsberg am Lech (DE); David Schick, Landsberg am Lech (DE); Bruno Maas, Landsberg am Lech (DE); Oliver Merker, Landsberg am Lech (DE); Thomas Schreiner, Landsberg am Lech (DE)

(73) Assignee: Rational AG, Landsberg am Lech (DE)

( * ) Notice: Subject to any disclaimer, the term of this patent is extended or adjusted under 35 U.S.C. 154(b) by 1197 days.

(21) Appl. No.: 16/646,897

(22) PCT Filed: Sep. 14, 2018

(86) PCT No.: PCT/EP2018/074959
§ 371 (c)(1),
(2) Date: Mar. 12, 2020

(87) PCT Pub. No.: WO2019/053222
PCT Pub. Date: Mar. 21, 2019

(65) Prior Publication Data
US 2020/0297159 A1  Sep. 24, 2020

(30) Foreign Application Priority Data
Sep. 14, 2017 (DE) ................ 10 2017 121 401.1

(51) Int. Cl.
*F24C 15/16* (2006.01)
*A21B 1/50* (2006.01)
(Continued)

(52) U.S. Cl.
CPC ............... *A47J 36/321* (2018.08); *A21B 1/50* (2013.01); *A21B 3/07* (2013.01); *A47J 27/13* (2013.01);
(Continued)

(58) Field of Classification Search
CPC .... A21B 1/40; A21B 1/50; A21B 3/07; F24C 15/008; F24C 15/04; F24C 15/16; G01N 33/02; F27D 3/12; F27D 2021/026
See application file for complete search history.

(56) References Cited

U.S. PATENT DOCUMENTS 11,013,237 B2 * 5/2021 Stork Genannt Wersborg ............ A21B 3/10
2017/0347409 A1 * 11/2017 De Luca ............... H05B 6/6402
2018/0324908 A1 * 11/2018 Denker .................. H04N 7/188

FOREIGN PATENT DOCUMENTS

DE  10 2008 031 378  1/2009
DE  20 2011 002 570  5/2012
(Continued)

OTHER PUBLICATIONS

International Search Report dated Dec. 21, 2018 of International application No. PCT/EP2018/074959.
(Continued)

*Primary Examiner* — Reginald Alexander
(74) *Attorney, Agent, or Firm* — Jones Day

(57) ABSTRACT

A loading and/or unloading station of at least one cooking device with a plurality of insertion levels defining insertion heights for food in at least one cooking chamber, the at least one insertion and/or food carrier which can be loaded with at least one food can be placed at each insertion height, the loading and/or unloading station including a sensing device for determining the loading of the cooking chamber, which has at least one camera device for recording images which
(Continued)

are evaluated or can be evaluated in a data processing device.

8 Claims, 1 Drawing Sheet

(51) Int. Cl.
    *A21B 3/07*     (2006.01)
    *A47J 27/13*     (2006.01)
    *A47J 36/16*     (2006.01)
    *A47J 36/32*     (2006.01)
    *F27D 3/12*     (2006.01)
    *F27D 21/02*     (2006.01)
    *G06T 7/00*     (2017.01)

(52) U.S. Cl.
    CPC ............... *A47J 36/16* (2013.01); *F24C 15/16* (2013.01); *F27D 3/12* (2013.01); *F27D 2021/026* (2013.01); *G06T 7/0002* (2013.01)

(56) References Cited

FOREIGN PATENT DOCUMENTS

| | | |
|---|---|---|
| DE | 10 2013 100 298 | 7/2014 |
| DE | 102013100298 | 7/2014 |
| DE | 10 2013 110 642 | 3/2015 |
| DE | 10 2013 114 227 | 6/2015 |
| DE | 10 2015 103 690 | 9/2016 |

OTHER PUBLICATIONS

Written Opinion dated Dec. 21, 2018 of International application No. PCT/EP2018/074959.
German Patent and Trademark Office, Appl. 10 2017 121 401.1, Search Report, Jun. 27, 2018.

* cited by examiner

LOADING AND UNLOADING STATION AND ALSO LOADING AND/OR UNLOADING METHOD OF A COOKING APPARATUS TO DETERMINE THE LOAD OF THE COOKING CHAMBER OF THE COOKING DEVICE

CROSS-REFERENCE TO RELATED APPLICATIONS

This application is a National Stage Entry of International Patent Application No. PCT/EP2018/074959, filed Sep. 14, 2018, which claims the benefit of priority to German Patent Application No. 10 2017 121 401.1, filed Sep. 14, 2017, each of which is hereby incorporated by reference in its entirety for all purposes.

BACKGROUND

1. Field of the Invention

The present disclosure related to a loading and/or unloading station as well as a loading and/or unloading method of a cooking device with insertion levels defining a plurality of insertion heights for food in at least one cooking chamber for determining the loading of the cooking chamber.

2. Related Art

It is common practice to load a cooking chamber of a cooking device with a large number of loading levels by moving a rack trolley into it. Thus DE 20 2006 009 956 U1 reveals a cooking device with a housing which has a door to a cooking chamber, carries a display and/or operating unit and is movable on wheels, wherein a tray rack trolley can be moved into and out of the cooking chamber, which has a first frame in conjunction with further wheels and at least one handle which is detachable from the first frame. The fact that the housing of the cooking device is mounted on a second frame, which has at least a first section extending beyond the circumference of the housing, which serves both as a ram protection as well as for temporarily holding the handle of the trolley, makes it possible to move the trolley easily and to transport food safely into the cooking chamber.

As tray rack trolleys allow cooking or regeneration of cooking goods on a number of different insertion levels, it is known that measured values of a cooking process can be recorded via a sensor device positioned on the shelf, see for example EP 1 646 829 B1. On the other hand an occupancy detection is desirable.

DE 10 2013 110 642 A1 describes the use of a camera in a cooking device for insertion detection and/or food detection, whereby the camera can be a plenoptical camera, also called light field camera, a time-of-flight camera, also called runtime camera, or a stereo camera. A motion detector can also be provided to detect the area in front of the slide-in modules. With the known method for insertion and/or food recognition, at least one image is recorded which contains distance information for each pixel, whereby the camera records an image when a food carrier is inserted into one of several inserts of the cooking device and the image is then evaluated.

The DE 10 2013 100 298 A1 describes a charging system for an apparatus for the heat treatment of foodstuffs, with a charging trolley, with at least one frame receptacle for receiving a charging frame for a plurality of product carriers, wherein the charging trolley can be selectively coupled to the heat treatment apparatus by means of a coupling device in order to transfer or receive the at least one charging frame, and with a detection device with at least one detector for detecting occupancy information of the at least one charging frame, which can be coupled in particular to the charging trolley.

A further device for the heat treatment of food, with a treatment chamber, with at least one insertion level for receiving a product carrier which is designed to receive products, with at least one heating device for heating the treatment chamber, and with a controller for controlling a treatment process, with at least one sensor for detecting the type of products and the occupancy of a product carrier with products is disclosed in DE 20 2011 002 570 U1, wherein a plurality of different reference products are stored in the controller together with characteristic data for identification, wherein the controller is adapted to compare the data detected by the sensor with the product-specific characteristic data and to perform automatic identification of the products, wherein the controller is further adapted to automatically detect the quantity of the products on each product carrier, and wherein the controller is further adapted to automatically control the heat treatment of the products in dependence on the detected type and quantity of the products.

By means of an automatic recognition independent of the control elements, a cooking device according to DE 10 2008 031 378 A1 is able to recognize, in particular, what type of food, what quantity and/or what number of food is being cooked in the cooking device. The interior of a cooking chamber can be accessed with an optical recognition system, for example with a barcode recognition system, if this is not located on the packaging material but on a cooking container, on a food carrier or directly on the food. Alternatively, the food can be identified directly by means of a photographic identification; or RFID identification can be carried out through a window to the cooking chamber. Food markers can be arranged in or on cooking containers, they can be placed in the cooking device with the food, or the food can be provided with a food marker.

DE 10 2015 103 690 A1 describes a method for detecting the direction of movement of a predetermined object, in particular cooking accessories, in the area of a cooking chamber opening of a cooking device with the following steps: a) continuous or repeated, in particular regularly repeated, generation of slide-in images of a detection area by means of a slide-in sensor, b) assignment of the slide-in images to a respective object category and noting of the assigned object category in a memory, at least if the object category differs from the object category last noted in the memory, c) determination of the direction of movement of the object on the basis of the sequence of the object categories noted in the memory, the object categories being noted in chronological order in the memory.

From DE 2013 114 227 A1, a method for detecting the loading of a cooking device is known, in which light is emitted from a light source, the emitted light is reflected at an object, the reflected light is detected by a light sensor, the distance between the light sensor and the object is determined on the basis of the time difference between emission and detection of the light, and the determined distance between the light sensor and the object is recorded. These steps are repeated at regular intervals in order to create at least one height profile from the recorded distances, which can be used to draw conclusions about the loading of the cooking device. A time-of-flight camera can be used as light sensor.

Since extreme conditions prevail in a cooking chamber, the protection of sensing devices must be taken into account. DE 10 2013 114 230 A1 teaches, for example, that the hot and humid air of a cooking chamber atmosphere, which can lead to fogging of an optic, can be kept away from the beam path and thus from the optic by a gas flow.

SUMMARY

In an aspect, a sensing device for determining the loading of the cooking chamber includes at least one camera device for recording images which are evaluated or can be evaluated in a data processing device, the camera device including at least one camera which is mounted or mountable on a frame or rack and/or on a movable carrying and/or receiving device for at least one food carrier, in particular in the form of a tray rack trolley or a tray rack, wherein the carrying and/or receiving device, each insert and/or each food carrier being equipped with an optical mark and/or an element of an electromagnetic identification system and being identifiable thereon by the loading and/or unloading station and/or the cooking device, automatically and/or on request.

It may be provided that the camera device comprises at least two cameras, and/or the camera device comprises at least one RGB camera, stereo camera, time-of-flight camera, strip light camera and/or light field camera, and/or the camera device is designed for a light intensity measurement, a light field measurement, a time-of-flight measurement, a structured light measurement, a laser triangulation and/or a focus depth analysis.

In an aspect of the invention it is proposed that at least one camera is mounted or mountable centrally above the uppermost insertion level, and/or at least one camera is mounted or mountable vertically above and horizontally in front of the carrying and/or receiving device, at least two cameras have different focus distances and/or focal lengths, and/or the field of view of at least one of the cameras is changeable, focusable and/or adjustable to certain insertion levels, preferably automatic and/or self-learning.

Furthermore, according to an aspect of the invention, it is provided that the carrying and/or receiving device is movable, in particular by means of a transport system that can preferably be attached to a kitchen ceiling, is mobile as an independent unit, is portable, or is designed as a cassette arranged on a movable base, a tray rack arranged on a movable base or as a tray rack trolley.

According to an aspect of the invention, it is preferred that the loading and/or unloading station and/or the rack is movable, in particular movable, and/or comprises an independent energy source, in particular comprising at least one battery or at least one accumulator.

In an an aspect of the invention it is further proposed that the data processing device is comprised of a control device and/or can be connected to a storage device, in particular via the Internet and/or the Intranet, wherein preferably the control device is selected from a control device of a cooking device, a carrying and/or receiving device, a merchandise management system, a kitchen network, a kitchen-wide production planning system and/or the loading and/or unloading station, and/or the loading and/or unloading station, the rack and/or the carrying and/or receiving device is/are movable in a controlled manner via the control device.

An aspect of the invention also provides a loading and/or unloading method of at least one cooking device with a plurality of insertion levels for food in at least one cooking chamber, defining insertion heights, in which a food and insertion level or insertion height detection is carried out, in that images are recorded by means of at least one camera device of a sensing device of the loading and/or unloading station in accordance with an aspect of the invention, and image features are evaluated in a data processing device, in particular for locating edges of inserts and/or food carriers and for detecting food on the inserts and/or food carriers.

It may be provided that data obtained in dependence on the food and insertion level or insertion height detection, in particular for information on the loading status of the carrying and/or receiving device, a program of a cooking device, in particular a cooking program from a plurality of cooking programs, is selected and/or suggested, preferably automatically and/or on request.

According to an aspect of the invention, it is preferred according to an aspect of the invention that, depending on the data obtained from the food and insertion level or insertion height detection, in particular for information about the loading status of the carrying and/or receiving device, at least one preparatory action for cooking and/or follow-up action for cooking is automatically initiated and/or an information is displayed and/or passed to a merchandise management system.

an aspect of the invention suggests that the preparatory action is selected from selection of the cooking device optimally suited for receiving the carrying and/or receiving device, preferably with optical and/or acoustic signaling to guide the user, selection of the location where the carrying and/or receiving device is to be positioned and/or stored, preferably with optical and/or acoustic signaling to guide the user, selection of a cooking program and/or starting a cooking program, preheating the cooking chamber of a cooking device, in particular the selected cooking device, and/or switching on a cooking device, in particular the selected cooking device.

In addition, according to an aspect of the invention, it may be provided that the follow-up action is selected from selection of the location where the support and/or receiving device is to be positioned and/or stored, preferably with optical and/or acoustic signalling to guide the user, cooling the cooking chamber of a cooking device, in particular the selected cooking device, selection of a cleaning program and/or starting a cleaning program, and/or switching off a cooking device, in particular the selected cooking device.

Furthermore, an aspect of the invention suggests that the displayed information is selected from a warning message if the data obtained from the food and insertion level or insertion height detection, in particular for information on the loading status of the carrying and/or receiving device, are incompatible with at least one cooking device, a time indication when loading and/or unloading of the cooking chamber or the carrying and/or receiving device is to start, and/or an instruction for action, in particular for optimizing the loading status of the carrying and/or receiving device.

It may also be provided that, in particular depending on the food recognition, a loading quantity is determined which is preferably output with optical and/or acoustic signaling to guide the user and/or transmitted to an merchandise management system system and/or a kitchen-wide production planning system, preferably automatically and/or on request.

According to an aspect of the invention, it is also suggested that the loading and/or unloading station communicates with a control device, in particular a self-learning device.

An aspect of the invention is the use of cameras, whereby further sensors are basically not necessary. Since the cameras are always located outside the cooking chamber, e.g. on a rack in the installation room, i.e. usually a kitchen, the risk of impairing the functionality or even destroying the cameras by exposure to the cooking chamber atmosphere is avoided.

Nevertheless, at least one further sensor, comprising an ultrasonic sensor and/or a distance sensor, in particular in the form of a radar distance sensor, may be provided for detecting at least one insertion plane or insertion height.

The fact that at least one camera is mounted or mountable centrally above the uppermost insertion level, and/or at least one camera and/or the at least one further sensor is mounted or mountable vertically above and horizontally in front of, in particular, the tray rack or tray rack trolley, makes it possible for the cameras to record images of and/or the sensors to record further measurement data on the inserts which are at least partially loaded with food to be cooked during insertion into the cooking chamber and/or during removal from the cooking chamber, without the view being obscured by inserts already located in the insert rails.

If at least two cameras have different focal distances and/or focal lengths, a sufficiently sharp and high-resolution image can be provided at each insertion level.

Alternatively, it may be provided that the cooking chamber has a cooking chamber opening which can be closed by a cooking chamber door and at least one camera through the cooking chamber opening records the load in the cooking chamber from outside the cooking chamber. Furthermore, the cooking chamber may have at least one window, preferably the cooking chamber door and/or one wall of the cooking chamber having a window, and at least one camera can detect the load in the cooking chamber through the window from outside the cooking chamber.

It may also be provided that at least one of the cameras can be moved, in particular into the cooking chamber and/or controlled, preferably telescopically.

At least one positioning device for a camera or the at least one further sensor may be provided, preferably a plurality of positioning devices being provided for releasably mounting at least one camera in a plurality of positions and/or for mounting a plurality of cameras.

It may also be provided that the viewing window of the camera device and/or of the at least one further sensor can be cleaned by a relative movement to a cleaning element.

The loading of the cooking chamber can be determined from at least one food size, such as for the type, quantity, size and/or condition of the food, and at least one insertion size, such as for the insertion level or the insertion height and/or for the position in an insertion level or the insertion height. This means that a food and insertion level or insertion height detection is carried out. Thus, for example, it can be determined on the basis of the loading of a tray rack trolley that 10 (quantity), small (size), frozen (texture) chicken legs (type) are loaded into a cooking chamber on each of the trays 1, 3, 5, 7 and 9 of 9 inserts.

In a data processing device, image features can be evaluated to locate the edges of inserts and/or food carriers and to detect food on the inserts and/or food carriers. It may be intended that artificial intelligence is used for edge localization, in particular artificial neural networks and/or convolutional neural networks.

It is also suggested that edge localisation is achieved by comparing the edge positions recorded by two cameras with each other, and/or comparing the edge positions recorded by a camera with the positions of insert rails of a tray rack or tray rack trolley, and/or determining the width of the insert and/or food carrier in an image recorded by a camera and calculating the distance by comparing it with the known width of the insert and/or food carrier.

An aspect of the invention is that the carrying and/or receiving device, e.g. in the form of a remote-controlled rack trolley, can be identified by means of an optical mark or an electromagnetic identification system of, for example, a cooking device, either automatically and/or on request. This enables an assignment of parameters, which are obtained from correspondingly processed, in particular coded, data of the sensing device, to carrying and/or receiving devices, so that an optimization of the device loading can be carried out via a control device, in particular after recognition of the food and current loading of the carrying and/or receiving devices.

If the loading and/or unloading station according to an aspect of the invention detects that the load currently being analyzed is not compatible with available cooking devices, a warning message can be issued after the invention or storage of the loaded carrying and/or receiving device can be recommended and, if necessary, the next possible time of cooking of the load can be displayed. This means that no cooking process or cooking program will be started if incompatibility of the foods is detected.

In addition, according to an aspect of the invention, a control device in which a suitable algorithm is stored or from which a suitable algorithm can be called up via, for example, a kitchen network, may be part of a merchandise management system or be independent or a component of a cooking device or the loading and/or unloading station. The control device with algorithm can also be cloud based.

According to an aspect of the invention, the control device can also take into account the storage of loaded carrying and/or receiving devices. In addition, the sensing device of the loading and/or unloading station according to the invention can detect finished cooked food and forward the corresponding data to a data terminal in order to ensure that the food is optimally dispensed, kept warm or stored.

According to an aspect of the invention, a communication of the loading and/or unloading station can also take place in such a way that information is sent to the station by a superordinate control device, which is then used to optimize the further process sequence. For example, this can compensate for a cooking device failure and/or take into account manual intervention by a user.

The use of a mobile loading and/or unloading station is particularly advantageous. The station is then mobile and can be moved depending on the place of preparation, e.g. to a goods receiving area, a cold storage cell or other preparation areas. The advantage here is the possibility of shortening the distances of the foods.

If the loading and/or unloading station contains an independent power supply, such as in the form of rechargeable batteries, it is also more flexible in its use.

BRIEF DESCRIPTION OF THE DRAWINGS

Further features and advantages of the invention result from the following detailed description of preferred embodiments by means of schematic drawings. Thereby shows.

DETAILED DESCRIPTION

Figure 1:
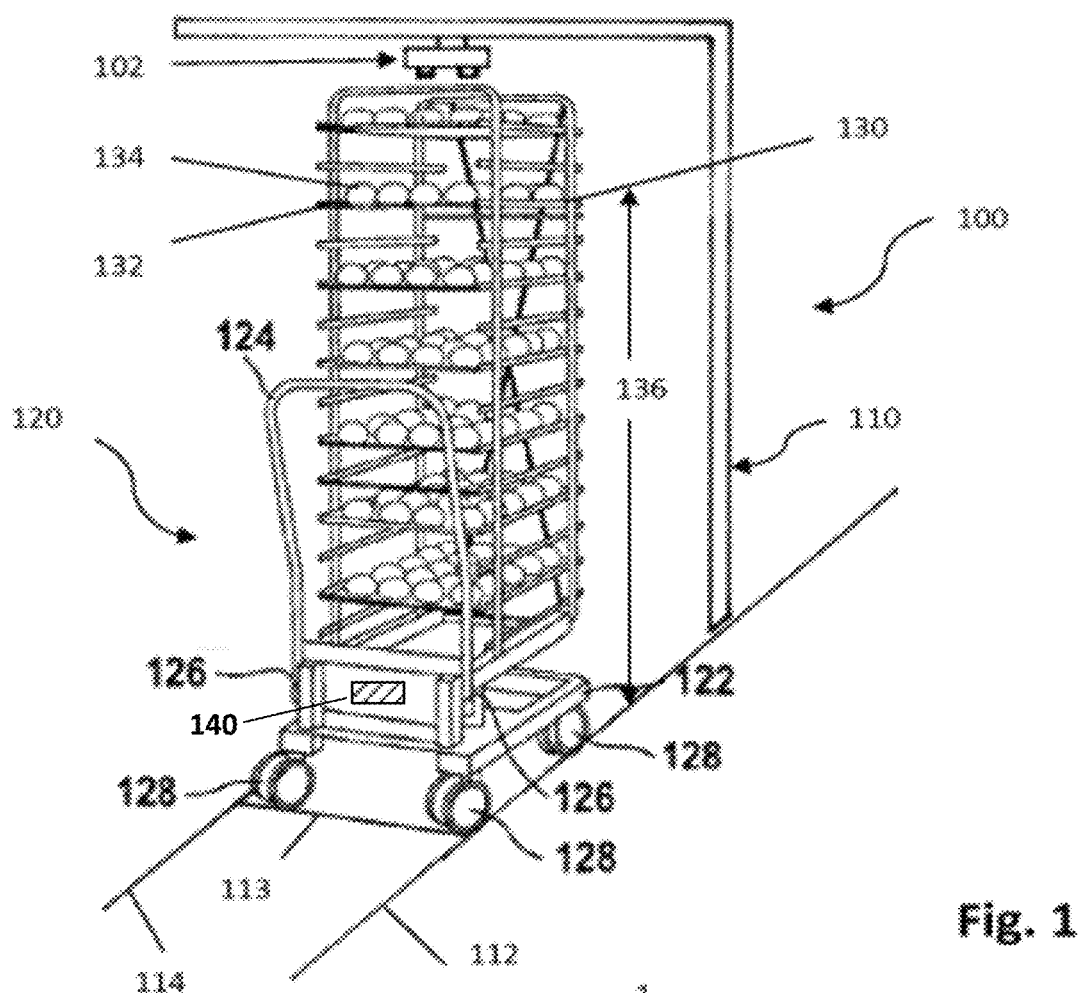
FIG. 1 is a perspective view of a first loading and/or unloading station according to an example of the invention.

A loading and/or unloading station 100 of the invention shown in FIG. 1 for a cooking device not shown comprises a stereo camera 102 mounted on a rack 110. In addition, FIG. 1 shows a tray rack trolley 120 with a frame 122 to which a bow-shaped handle 124 can be detachably attached, namely by inserting its two free ends into receiving openings 126, and which can be moved by means of lockable rollers 128. The tray rack trolley 120, as an example of a carrying and/or holding device for food carriers, has a large number of insert rails 130 for inserts 132 with food 134. To be more precise, at each insert height 136 a pair of insert rails 130 is provided by the tray rack trolley 120, into which a insert 132 can be inserted as a cooking rack. Each insert 132 can be loaded with food 134 in the loading and/or unloading station 100. This loading and unloading must be recorded, in particular in order to be able to determine which food 134 is to be cooked in a cooking chamber, in what quantity and at what insert height 136, after the loaded tray rack trolley 120 has been moved into the cooking device in the usual manner. Knowing the load of the cooking chamber of the cooking device facilitates the at least partially automated cooking of the food to be cooked and allows the cooking quality to be increased.

If the tray rack trolley 120 is moved into the loading and/or unloading station 100 along a floor marker 112-114, the stereo camera 102 is positioned centrally above the uppermost insert 132 for recording the loading.

A loading and/or unloading station may also be located near a cooking chamber opening that can be closed by a door, but outside the cooking device and separate from it. If the door and/or oven cavity has a viewing window, then even the load in the oven cavity of the cooking device can be determined. For this purpose, more than one stereo camera or more than two individual cameras can be or are mounted on one frame. The camera(s) can be used to monitor the loading process as well as the unloading process of the cooking chamber, for example by detecting the side edges of the inserts when they are inserted into the cooking chamber or when they are pulled out of the cooking chamber. For example, a triangulation of recorded pixels in accordance with WO 2016/034295 A1 can be carried out for the identification of food and inserts.

Cameras can also be mounted on a ceiling at the location of the cooking device or on an exhaust hood of the cooking device. According to the invention, it is also intended that a camera of a loading and/or unloading station can be introduced into the cooking chamber, e.g. via a telescopic arm or the like.

The tray rack trolley 120 also carries an optical mark or an electromagnetic identification system 140, so that it can be identified by the rack 110 and the cooking device.

Figure 2:
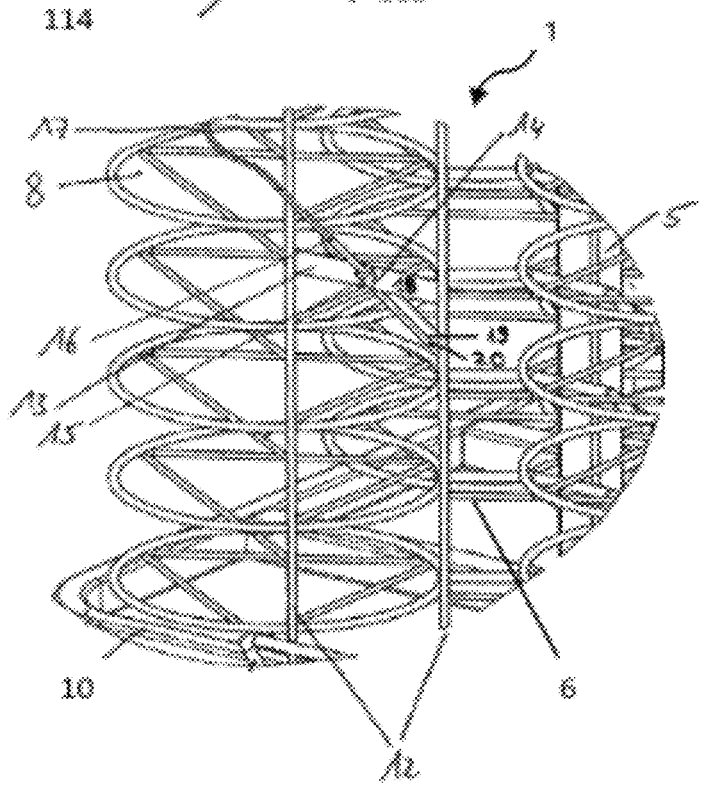
FIG. 2 is a partial perspective view of a second loading and/or unloading station according to an example of the invention.

FIG. 2 shows a further loading and/or unloading station according to the invention, which has a portable tray rack 1 as a carrying and/or receiving device for food carriers in the form of plates not shown. The tray rack 1 is equipped with several insertion columns 6, each for a multitude of plate holders 8. A frame 10 of tray rack 1 has vertically running bars 12, essentially between two adjacent insertion columns 6, which run along it. A positioning device 13 for a holder 15 is arranged between two bars 12 at the upper end not shown, above the uppermost plate holders 8 and at about half the height of the tray rack 1. Each positioning device 13 comprises a beam 18 extending substantially horizontally between the two bars 12 and a recess 14 preferably located centrally in the beam 18. In addition, a camera 20 can be inserted into the holder 15, as shown in FIG. 2 for the positioning device 13, which is located at about half height.

Likewise, a part of an electromagnetic identification system can be attached there, while another part can be attached to the cooking device.

A camera is also held in the holder of the upper positioning device, so that at least two cameras are provided. The cameras can be simple cameras if the area being monitored does not contain a large difference in insertion height. Since the depth measurement accuracy decreases with increasing distance of an insertion, the number of cameras to be arranged one above the other depends on the number of insertion levels. The use of a stereo camera in the upper positioning device makes it possible to dispense with the arrangement of a further camera in the centrally arranged positioning device.

For example, an upper positioning device with a stereo camera can be used for each insertion column. However, a stereo camera can also monitor the loading of several insertion columns. Due to the many possibilities for the arrangement of cameras, it is particularly advantageous that the positioning devices can be easily moved. Several positioning devices can also be provided, which can optionally be equipped with cameras. This leads to a high flexibility.

For example, two RGB cameras 20 can be used per tray rack to simultaneously record images. According to the invention, this enables insertion plane detection via edge localization of plate images 8, in which a comparison of the edge positions recorded by the two cameras is carried out.

One identification element can also be provided per plate holder, while one element per tray rack is sufficient.

FIG. 2 further shows that a cable 17 extends from each positioning device to supply data recorded by a camera 20 and an identification element to a data processing device. The cables 17 must not be pulled over or through the insertion levels. The bars 12 also serve as cable deflectors for this purpose, as they prevent the cables 17 from easily reaching the insertion levels, even in an area of a plate holder 8.

In the data processing device, which may be comprised of a central computer of a kitchen network, a portable operating device for one or more cooking devices or a cooking device, different programs for determining the load can be carried out.

The acquired images can be automatically collected and stored in an image database. The location of the image database is either the data processing device or a server connected to the data processing device via a network. The images in the image database can be used to self-learning adapt the system to the conditions at the respective customer, for example customer-specific food.

The data processing device may use stored images and/or image features calculated therefrom and/or artificial intelligence parameters calculated therefrom to determine the loading.

The features of the invention disclosed in the above description as well as in the claims and drawings may, either individually or in any combination, be essential for the realisation of the invention in its various embodiments.

LIST OF REFERENCE SIGNS

1 Tray rack
6 Insertion column
8 Plate holders
10 Frame
12 Bar
13 Positioning device
14 Recess 15 Holder
17 Cable
18 Beam
20 Camera
100 Loading and/or unloading station
102 Stereocamera
110 rack
112-114 Floor marking
120 tray rack trolley
122 Frame
124 Handle
126 Receiving opening
128 Roller
130 insert rail
132 insert
134 food
136 Insertion height

What is claimed is:

1. A system, comprising:
a loading or unloading station of at least one cooking device with a plurality of insertion levels defining insertion heights for food in at least one cooking chamber;
a movable carrying or receiving device for at least one cooking product carrier in the form of a tray rack trolley or a tray rack;
a sensing device for determining the loading of the cooking chamber, comprising at least one camera device for recording images; and
a data processing device in which the images are evaluated or can be evaluated,
wherein at least one insert of the tray rack trolley or a food carrier of the tray rack trolley, which can be loaded with at least one cooking good, can be placed at each insertion height,
wherein the camera device comprises at least one camera which is mounted or mountable on a frame of the loading or unloading station or on a rack of the carrying or receiving device, and
wherein the carrying or receiving device is equipped with an optical mark or an element of an electromagnetic identification system and is identifiable by one or more of the loading or unloading station or the cooking device, automatically or on request,
wherein image features are evaluated using the data processing device, and wherein the image features are evaluated for locating edges of at least one of inserts or food carriers and for detecting food on the at least one of inserts or food carriers, and
wherein one or more of the loading or unloading station or the carrying or receiving device is movable in a controlled manner via the control device.

2. The system according to claim 1, wherein:
the camera device comprises at least one RGB camera, a stereo camera, a time-of-flight camera, a strip light camera, or a light field camera, or
the camera device is designed for one or more of a light intensity measurement, a light field measurement, a time-of-flight measurement, a structured light measurement, a laser triangulation, or a focus depth analysis.

3. The system according to claim 1, wherein at least one of
at least one camera of the camera device is mounted or mountable centrally above the uppermost insertion level, or
at least one camera of the camera device is mounted or mountable vertically above and horizontally in front of the carrying or receiving device.

4. The system according to claim 2, wherein
a field of view of the at least one camera is one or more of changeable, focusable adjustable to certain insertion levels, automatic, or self-learning.

5. The system according to claim 1, wherein the carrying or receiving device is movable, and
is mobile as an independent unit,
is portable, or
is designed as a cassette arranged on a movable base, a tray rack arranged on a movable base or as a tray rack trolley.

6. The system according to claim 1, wherein the rack of the loading or unloading station is moveable.

7. The system according to claim 1, wherein one or more portable tray rack or plate holder is equipped with an optical mark or an element of an electromagnetic identification system and is identifiable thereon by one or more of the loading or unloading station or the cooking appliance, automatically or on request.

8. The system according to claim 1, wherein the data processing device is at least one of comprised by a control device or can be connected to a storage device via internet or intranet, and
the control device is selected from one or more of a control device of the cooking device, the carrying or receiving device, a merchandise management system, a kitchen network, a kitchen-wide production planning system, or the loading or unloading station.

* * * * *